US006595701B2

(12) United States Patent  
Terada et al.

(10) Patent No.: US 6,595,701 B2  
(45) Date of Patent: Jul. 22, 2003

(54) LASER DIODE MODULE

(75) Inventors: Kohei Terada, Tokyo (JP); Takeshi Nagao, Tokyo (JP); Narihito Matsumoto, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 30 days.

(21) Appl. No.: 10/015,635

(22) Filed: Dec. 17, 2001

(65) Prior Publication Data

US 2002/0114593 A1 Aug. 22, 2002

(30) Foreign Application Priority Data

Dec. 18, 2000 (JP) ........................................ 2000-383487

(51) Int. Cl.[7] ................................................ G02B 6/42
(52) U.S. Cl. .................................... 385/93; 385/90
(58) Field of Search ...................................... 385/88–94

(56) References Cited

U.S. PATENT DOCUMENTS 5,247,530 A * 9/1993 Shigeno et al. ............... 372/36
5,974,065 A * 10/1999 Kanda .......................... 372/43
6,120,191 A * 9/2000 Asakura et al. .............. 385/93
6,359,330 B1 * 3/2002 Goudard ...................... 257/678

FOREIGN PATENT DOCUMENTS

JP       01235910 A  *  9/1989  ............ G02B/7/02

* cited by examiner

*Primary Examiner*—John D. Lee  
*Assistant Examiner*—Sarah U Song  
(74) *Attorney, Agent, or Firm*—Oblon, Spivak, McClelland, Maier & Neustadt, P.C.

(57) ABSTRACT

A laser diode module has a laser diode, a lens for condensing the laser beam from the laser diode, an optical fiber for receiving the laser beam from the lens at the end face thereof, and support assembly for supporting the laser diode, the lens, and optical fiber, the support assembly positions the end face of the optical fiber at a deviation position apart from the focal point of the lens by an allowable distance when a temperature of the laser diode module is room temperature and moves the end face of the optical fiber at a close position relatively closer to the focal point than the deviation position when the temperature of the laser diode module rises from the room temperature.

9 Claims, 6 Drawing Sheets

LASER DIODE MODULE

BACKGROUND OF THE INVENTION

1. Field of the Invention

The present invention relates to a laser diode module which is suitably used in the field of optical communications and optically couples a laser diode to an optical fiber.

2. Description of the Related Art

A laser diode module (hereinafter called "LD module") in which a laser diode (hereinafter abbreviated as "LD") and an optical fiber are optically coupled to each other in a manner of condensing a laser beam from the LD on an inlet end face of the optical fiber through a lens. The optical fiber delivers the received laser beam from an outlet end face thereof. At the time of manufacturing an LD module, alignment including optical axis alignment and focus point adjustment among the LD, the lens and the optical fiber is carried out with a precision of 1 μm or less in order to acquire the desired optical output. The alignment is executed while monitoring the optical output of the LD module. That is, to acquire the maximum amount of light from the outlet end face of the optical fiber, the inlet end face of the optical fiber is positioned at the focal point of the lens where the laser beam is condensed. The aim of such alignment is to minimize the adverse influence of a variation in the working precision of the constituting members with respect to the performance of the LD module.

When the support members that support the constituting elements of the LD module, such as the LD, the lens and the optical fiber, are heated due to the heat generation of the LD itself or a rise in the environmental temperature of the LD module, those support members thermally expand, deviating the relative positions of the LD, the lens and the optical fiber that have been aligned in the order of microns. The deviation in the relative positions lowers the optical coupling efficiency between the LD and the optical fiber (hereinafter simply called "optical coupling efficiency") and results in reduction of the optical output of the LD module. Specifically, the temperature of the support members comes in a range of 60° C. to 90° C., for example, the optical output of the LD module declines prominently. The reduction in the optical output of the LD module may disable optical communications using the LD module.

To cope with the problem, a typical LD module is equipped with a temperature control device, such as a Peltier device. The temperature control device discharges the thermal energy originated from the heat generation of the LD or a rise in environmental temperature out of the LD module.

However, the LD module equipped with a temperature control device has following shortcomings. First, because of the large size, this type of LD module cannot be housed in a package for a communication transceiver which demands miniaturization. Further, the LD module needs a power source for driving the temperature control device or the Peltier device and an external control circuit for controlling the operation of the Peltier device. The power source and external control circuit result in an increase in the cost of the LD module.

Moreover, when the performance of the temperature control device is insufficient, the temperature of the LD module, i.e., the temperature of the support members inevitably rises.

Accordingly, it is an object of the present invention to provide an LD module which suppresses a reduction in optical output originated from the heat generation of an LD or a rise in ambient temperature and whose cost reduction and miniaturization can be achieved.

SUMMARY OF THE INVENTION

A laser diode module according to the present invention comprises a laser diode having an end face from which a laser beam is emitted; a lens which has an input-side principal plane and an output-side principal plane, and condenses the laser beam from the laser diode at a focal point thereof; an optical fiber having an end face for receiving the laser beam condensed by the lens and delivering the received laser beam as an output of said module; and support means for supporting the laser diode, the lens and the optical fiber and securing an inlet distance between the end face of the laser diode and the input-side principal plane of the lens and an outlet distance between the output-side principal plane of the lens and the end face of the optical fiber. The support means positions the end face of the optical fiber at a deviation position apart from the focal point of the lens by an allowable distance with respect to the output of said module when a temperature of the laser diode module is room temperature and moves the end face of the optical fiber at a close position relatively closer to the focal point than the deviation position when the temperature of the laser diode module rises from the room temperature.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

In this description, an "inlet distance" indicates a distance between an end face of an LD from which a laser beam is emitted and an input-side principal plane of a lens. An "outlet distance" indicates a distance between an output-side principal plane of the lens and an end face of an optical fiber which receives the laser beam that is condensed by the lens.

In this description, a "first link member" is a member that supports the LD and the lens and determines a relative distance of the end face of the LD and the input-side principal plane of the lens.

In this description, a "second link member" is a member that supports the lens and the optical fiber and determines a relative distance of the output-side principal plane of the lens and the end face of the optical fiber.

Each of the first and second link members may comprise a plurality of constituting elements.

In this description, an "environmental temperature" is a temperature of a local ambient at which the individual members constituting the LD module are exposed. A "standard temperature" indicates a reference temperature at the time the LD module is assembled. For example, room temperature of 18° C., 20° C., 25° C. or the like can be selected as the reference temperature. When the environmental temperature is the standard temperature, the LD can keep a high optical output. The upper limit of temperature at which the LD module is used is restricted within a temperature range of 60 to 90° C.

Figure 1:
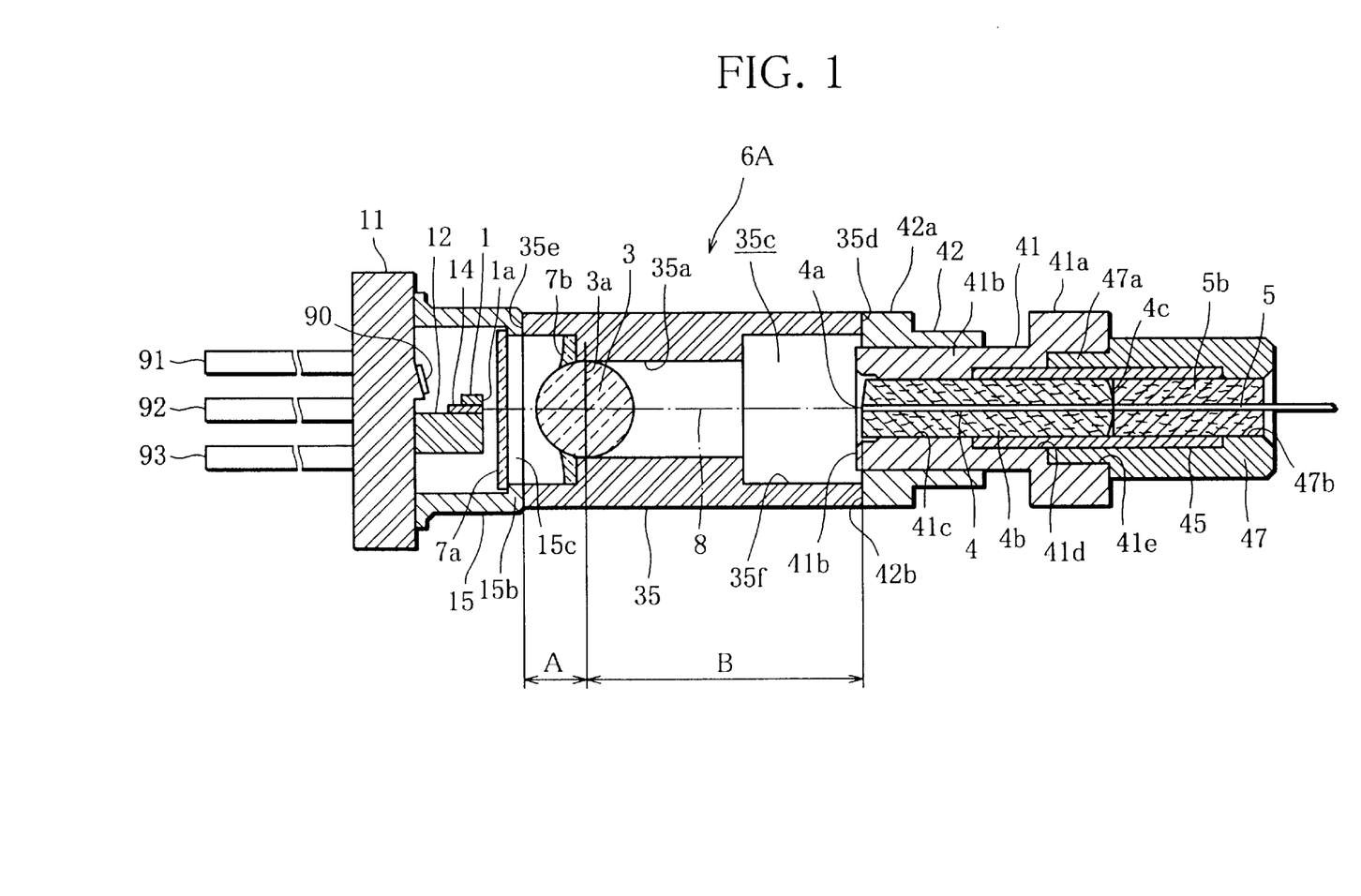
FIG. 1 is a longitudinal cross-sectional view of an LD module 6A according to one embodiment of the present invention.

An LD module 6A in FIG. 1 is a receptacle module provided with an LD1. The LD 1 has an end face 1a from which a laser beam is emitted.

As shown in FIG. 1, the LD1 is mounted on a pedestal 12 via a heat sink 14. For example, the pedestal 12 and the heat sink 14 are made of an iron-based alloy and copper, respectively. The heat sink 14 facilitates heat discharge from the LD 1. The heat sink 14 may be made of aluminum or diamond.

The pedestal 12 is secured to the inner surface of an end plate 11 which has a disk-like shape. A photodiode (hereinafter abbreviated as "PD") 90 is attached onto the inner surface of the end plate 11. The PD 90 monitors a light emission state of the LD 1. Specifically, the PD 90 detects a backward radiation from the LD 1 toward the end plate 11. The backward radiation is significantly smaller than the laser beam emitted from the end face 1a of the LD 1. A plurality of lead pins 91 to 93 are protruded outward from the outer surface of the end plate 11, and are electrically connected to the LD 1 and the PD 90.

The LD 1 and the PD 90 are enclosed by a cap 15 of Fe—Ni—Co alloy called KOVAR (Trade Mark). The cap 15 has a hollow cylindrical shape with its one end secured to the inner surface of the end plate 11. An inner flange 15b is integrally formed at the other end of the cap 15. The inner flange 15b defines a circular window 15c at the other end of the cap 15. Glass 7a is adhered to the window 15c to permit the transmission of the laser beam from the LD 1. The end plate 11, the cap 15 and the glass 7a define an airtight chamber, which is filled with an inactive gas.

A hollow cylindrical lens holder 35 is coupled to the other end of the cap 15 via the inner flange 15b. The lens holder 35 is made of a stainless steel material, for example, SUS 304 that is defined by JIS (Japanese Industrial Standard). A through hole 35f of the lens holder 35 is open to both end faces 35d and 35e thereof. The lengthwise center portion of the through hole 35f is defined as a small-diameter portion 35a. A sphere lens 3 is partly fitted in one end of the small-diameter portion 35a on the LD 1 side or the end face 35e side. The sphere lens 3 is fixed to the lens holder 35 by cement 7b of low-melting point glass. The other opening end of the through hole 35f communicates with a ferrule sleeve 42. The ferrule sleeve 42 is mounted on a small-diameter portion of a ferrule holder 41 which will be discussed later. A chamber 35c is defined between the other end of the small-diameter portion 35a and the ferrule sleeve 42 in the lens holder 35. The chamber 35c is needed for alignment operation of the ferrule holder 41.

The lens 3 has a focal distance or a focal point. The output-side principal plane and input-side principal plane of the lens 3 are both denoted by symbol "3a", and those principal planes 3a lie in the same plane. The principal planes 3a are perpendicular to an optical axis 8 indicated by a one-dot chain line. The optical axis 8 extends from the LD 1 and passes through the center of the lens 3. The lens 3 may be a spherical lens, an aspherical lens, a rod lens or a combination of those lenses. The lens 3 may be secured to the holder 35 via a fixing member instead of the cement 7b. In this case, the shape of the fixing member is not particularly limited.

The ferrule sleeve 42 made of, for example, SUS 304 is coupled to the holder 35 so that the other end face 35d of the holder 35 and an end face 42b of the ferrule sleeve 42 keep in contact with each other. More specifically, the holder 35 and the ferrule sleeve 42 are coupled to each other by laser-welding the peripheries of the butted end faces 35d and 42b using a YAG laser after alignment to be discussed later is performed. The ferrule sleeve 42 is a nearly circular cylinder with a flange 42a for securing the end face 42b at the one end. The ferrule holder 41 is fitted in the ferrule sleeve 42. One end of the ferrule holder 41 slightly protrudes into holder 35 while the other end of the ferrule holder 41 significantly sticks out of the sleeve 42.

After the alignment to be discussed later is executed with the ferrule holder 41 fitted in the ferrule sleeve 42, the ferrule holder 41 is connected to the sleeve 42 by laser welding using the YAG laser. The holder 41 made of, for example, SUS 304 has a stepped hollow cylindrical shape. More specifically, the holder 41 has a small-diameter portion 41b which is fitted in the sleeve 42, and a large-diameter portion 41a which sticks out of the sleeve 42. The large-diameter portion 41a forms a flange. A stepped through hole is formed coaxial to the optical axis 8 in the ferrule holder 41. The through hole has a small-diameter hole portion 41c, an intermediate-diameter hole portion 41d and a large-diameter hole portion 41e in order from the end face side of the small-diameter portion 41b.

A ferrule 4b is retained concentrically in the ferrule holder 41 and has its one end fitted in the small-diameter hole portion 41c. A pipe sleeve 45 is fitted between the ferrule 4b and the inner surface of the intermediate-diameter hole portion 41d. The pipe sleeve 45 protrudes from the other end of the holder 41. A sleeve retainer 47, i.e., a small-diameter end portion 47a of the retainer 47 is fitted between the pipe sleeve 45 and the inner surface of the large-diameter hole portion 41e. The large-diameter portion of the sleeve retainer 47 encloses the portion of the pipe sleeve 45 that protrudes from the holder 41.

The ferrule 4b, which is made of zirconia, has a through hole in its center. An optical fiber 4 is inserted in the through hole of the ferrule 4b and is coupled to the ferrule 4b by an adhesive. One end face 4a of the optical fiber 4 on the lens 3 side is positioned in approximately the same plane as the other end face 35d of the lens holder 35. Both end faces of the ferrule 4b are polished together with the optical fiber 4. Specifically, one end face 4a of the ferrule 4b is polished at a bevel to prevent light reflection, and the other end face 4c of the ferrule 4b is rounded for PC (Physical Contact) connection to another optical fiber 5.

The fixing of the ferrule 4b and the pipe sleeve 45 to the holder 41 and the fixing of the holder 41 and the sleeve retainer 47 are carried out as follows. First, the optical fiber 4 is connected to the ferrule 4b by an adhesive. Then, the pipe sleeve 45 is attached to the ferrule 4b. Then, the ferrule 4b and the pipe sleeve 45 are respectively fitted in the small-diameter hole portion 41c and the intermediate-diameter hole portion 41d of the holder 41. Then, the inserting end portion 47a of the sleeve retainer 47 is pressed into the large-diameter hole portion 41e of the holder 41.

The sleeve retainer 47 has a plug hole 47b which has the same diameter as that of the small-diameter hole portion 41c. At the time the LD module 6A is actually used, a ferrule 5b with the optical fiber 5 is inserted into the plug hole 47b so that the optical fiber 5 is connected by PC to the optical fiber 4. For example, the ferrule 5b is an SC ferrule, FC ferrule, LC ferrule or the like.

In manufacturing the LD module 6A, alignment of the LD module 6A is carried out in the following procedures.

First, instead of the ferrule 5b with the optical fiber 5, a connector plug (not shown), which has an optical fiber for monitoring the optical output of the LD module 6A, is inserted in the plug hole 47b of the sleeve retainer 47. The optical fiber of the connector plug is connected by PC to the optical fiber 4. Therefore, the laser beam emitted from the LD 1 is delivered from the optical fiber of the connector plug via the lens 3 and the optical fiber 4.

In this state, before connection of the ferrule sleeve 42 to the lens holder 35, the ferrule sleeve 42 is moved in a direction perpendicular to its axial direction while the contact of the end face 42b of the ferrule sleeve 42 to the end face 35d of the lens holder 35 is maintained. This changes the radial position of the ferrule sleeve 42 with respect to the lens holder 35 or the optical axis. When a maximum of the optical output from the optical fiber 4 is detected based on the output change of the laser beam delivered from the optical fiber of the connector plug, the relative position between the ferrule sleeve 42 and the lens holder 35 is determined. At this time, the lens holder 35 and the ferrule sleeve 42 are connected together by the YAG laser as mentioned earlier. As a result, the optical fiber 4 is accurately positioned on the optical axis 8, which completes the optical axis alignment.

Next, positioning of one end face 4a of the optical fiber 4 with respect to the focal point 7 of the lens 3 is performed. In this positioning, the ferrule holder 41 is moved in the direction of the optical axis in the ferrule sleeve 42. When a maximum output of the optical output from the optical fiber 4 is detected based on the output change of the laser beam delivered from the optical fiber of the connector plug, the axial position of one end face 4a of the optical fiber 4 or the ferrule holder 41 is located in connection with the focal point 7. Thereafter the end face 4a of the optical fiber 4 is moved by a preset distance c from the located position, the ferrule sleeve 42 and the ferrule holder 41 are connected together by laser welding using the YAG laser. This completes the positioning of the optical fiber 4 to the focal point 7, i.e., the focus point adjustment.

The distance c is determined in such a way that the optical output of the LD module 6A at the standard temperature does not get lower than the value defined by the specification of the LD module 6A in consideration of the influence of a rise in environmental temperature on the LD module 6A.

Figure 2:
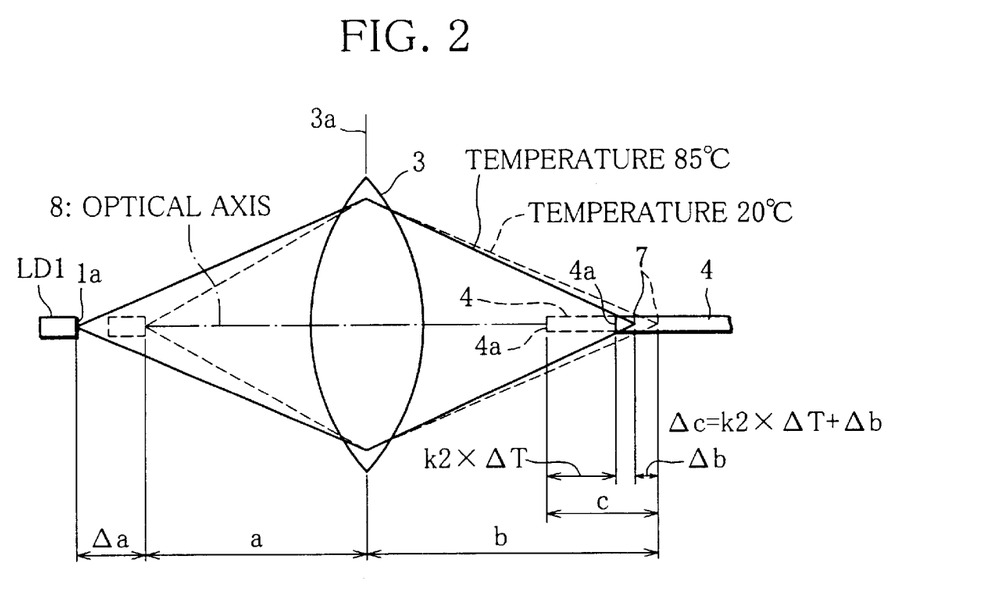
FIG. 2 is a diagram for explaining a change in the focal point of the LD module 6A in FIG. 1, which is caused by a rise in environmental temperature.
Figure 3:
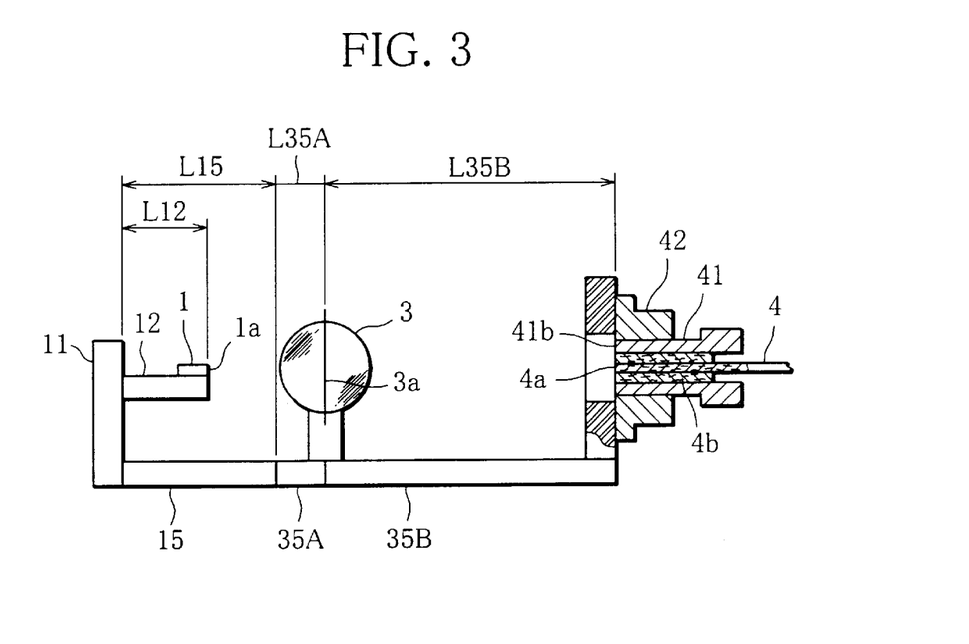
FIG. 3 is a diagram for explaining relative positions of individual members that constitute the LD module 6A in FIG. 1.

More specifically, when the environmental temperature becomes higher than the standard temperature by $\Delta T$, as shown in FIG. 2, the inlet distance a between the output-side end face 1a of the LD 1 and the input-side principal plane 3a of the lens 3 changes by a change $\Delta a$ with the input-side principal plane 3a as a reference due to the thermal expansions of the pedestal 12, the cap 15 and an area A (see FIG. 1) of the lens holder 35 between the input-side principal plane 3a of the lens 3 and the one end 35e of the lens holder 35 (where $\Delta a \geq 0$). The change $\Delta a$ is obtained by the following equations (1), (2) and (3) for a model shown in FIG. 3 which is a simplified illustration of the LD module 6A in FIG. 1.

$$\Delta a = (L15 \times \alpha 15 + L35A \times \alpha 35 - L12 \times \alpha 12) \times \Delta T \qquad (1)$$

$$= L0 \times \alpha 0 \times \Delta T \qquad (2)$$

$$= k1 \times \Delta T \qquad (3)$$

In the equation (1), L12, L15 and L35A respectively indicate the lengths of the pedestal 12, the cap 15 and the area A of the lens holder 35 along the optical axis as shown in FIG. 3, and $\alpha 12$, $\alpha 15$ and $\alpha 35$ respectively indicate the coefficients of linear expansion of the pedestal 12, the cap 15 and the lens holder 35. L0 and $\alpha 0$ in the equation (2) are respectively an equivalent length and an equivalent coefficient of linear expansion of the pedestal 12, the cap 15 and the area A of the lens holder 35 when these three parts are considered as a single member. Given that $L0 \times \alpha 0$ is k1, k1 indicates a unit change (mm/° C.) in the inlet distance a or a thermal expansion rate when the environmental temperature rises by 1° C. Therefore, $k1 = L15 \times \alpha 15 + L35A \times \alpha 35 - L12 \times \alpha 12$.

That is, the change $\Delta a$ is proportional to a change $\Delta T$ in environmental temperature in accordance with the thermal expansion rate k1 as a proportional coefficient, which is determined by the lengths and the coefficients of linear expansion of the pedestal 12, the cap 15 and the area A of the lens holder 35. In the LD module 6A, therefore, the pedestal 12, the cap 15 and the area A of the lens holder 35 and the end plate 11 constitute the first link member, wherein the pedestal 12, the cap 15 and the area A determine the relative distance between the end face 1a of the LD 1 and the input-side principal plane 3a of the lens 3. In this case, L0 and $\alpha 0$ correspond to the length and the coefficient of linear expansion of the first link member, respectively.

When a change $\Delta a$ occurs, a distance b between the focal point 7 of the lens 3 and the output-side principal plane 3a of the lens 3 changes by a change $\Delta b$ as shown in FIG. 2 in accordance with the formula of the lens given by the following equation 4 (where $\Delta b > 0$).

$$1/f = 1/(a+\Delta a) + 1/(b-\Delta b) \qquad (4)$$

where f is the focal distance of the lens 3. The focal distance f is determined by the diameter and the refractive index or the like of the lens 3 and is considered not to be changed by a change in environmental temperature. When the environmental temperature of the LD module 6A changes, therefore, the change $\Delta b$ depends on the change $\Delta a$ alone.

The distance between one end face 4a of the optical fiber 4 and the focal point 7 that are respectively shown by broken lines in FIG. 2 is equal to the distance c at the standard temperature (25° C.) as mentioned earlier. Suppose that the environmental temperature has risen by $\Delta T$ and the distance between the end face 4a of the optical fiber 4 and the focal point 7 that are respectively shown by solid lines becomes $c - \Delta c$ (where $\Delta c \geq 0$), the change $\Delta c$ is acquired by the following equation (5) based on the thermal expansion of an area B (see FIG. 1) between the output-side principal plane 3a of the lens 3 and the other end face 35d of the lens holder 35 and the change Δb according to the change Δa.

$$\Delta c = L35B \times \alpha 35 \times \Delta T + \Delta b \quad (5)$$

$$= k2 \times \Delta T + \Delta b \quad (6)$$

where L35B is the length of the area B of the lens holder 35 as shown in FIG. 1. Given that k2=L35B×α35, k2 indicates a unit change (mm/° C.) in the relative distance between the one end face 4a of the optical fiber 4 and the output-side principal plane 3a of the lens 3 or a thermal expansion rate with respect to a rise in temperature by 1° C.

In the LD module 6A, therefore, the area B of the lens holder 35 constitutes the second link member, wherein the area B defines the relative distance between the one end face 4a of the optical fiber 4 and the output-side principal plane 3a of the lens 3. In this case, L35B and α35 correspond to the length and the coefficient of linear expansion of the second link member, respectively.

The feature of the LD module 6A lies in that a decline of the optical output of the LD 1 when the environmental temperature rises is compensated for by improving the optical coupling efficiency between the LD 1 and the optical fiber 4. This requires that the one end face 4a of the optical fiber 4 should approach the focal point 7 as the environmental temperature rises.

To improve the optical coupling efficiency proportionally with respect to a rise in temperature, it is preferable that the change Δc should not exceed the distance c during the temperature rise and the change Δc becomes equal to the distance c at the upper limit of temperature for the usage of the LD module 6A. This is because as the change Δc changes this way, the optimal optical coupling efficiency can be achieved at the upper limit of temperature for the usage of the LD module 6A, e.g., 85° C.

It is therefore desirable that the distance c and the change Δc have the relationship that is given by the following equation (7).

$$0 < \Delta c \leq c \quad (7)$$

Combining the equations (6) and (7) derive the following equation (8).

$$0 < \Delta c = k2 \times \Delta T + \Delta b \leq c \quad (8)$$

It is therefore clear that the lengths and the coefficients of linear expansion of the first and second link members should be selected in such a way as to satisfy the equation (8) in manufacturing the LD module 6A. In the LD module 6A set this way, the distance b is longer than the outlet distance by the distance c when the environmental temperature is room temperature. As the environmental temperature rises, the distance b becomes shorter by the change Δb and the outlet distance becomes longer at the same time. As a result, the focal point 7 of the lens 3 and the one end face 4a of the optical fiber 4 come closer to each other by the change Δc. It is needless to say that the distance c is determined in such a way that the optical output of the LD module 6A obtained from the optical fiber at the standard temperature does not go below the value defined by the specification of the LD module 6A.

In case where the distance b changes greatly with respect to a slight change in the inlet distance a due to a rise in environmental temperature, the LD module 6A has a difficulty to provide a stable optical coupling efficiency. To achieve the stable optical coupling efficiency by avoiding such a large change in distance b, it is preferable to set a ratio of the distance a to the focal distance f of the lens at a value from 1.03 to 3, and more preferably, the ratio is set at two. With this setting, if Δa is very small, it is apparent from the equation (4) that Δb becomes approximately equal to Δa (Δa≈Δb), Δb also becomes very small and does not become large.

When Δa≈Δb is satisfied, replacing Δb in the equation (8) with Δa in the equation (3) derives the following equations (9) and (10).

$$k2 \times \Delta T + k1 \times \Delta T \leq c \quad (9)$$

$$k2 > (-1) \times k1 \quad (10)$$

With the equation (8) satisfied, if Δa, thus Δb, is so small as to be negligible with respect to Δc, the following equation (11) is derived from the equation (8).

$$\Delta c = k2 \times \Delta T \leq c \quad (11)$$

As apparent from the equation (1), when L15×α15+L35A×α35=L12×α12 is set, k1 and Δa can be rendered 0. If the change Δa is 0 when the environmental temperature changes, the change Δb of the distance b between the focal point 7 and the output-side principal plane 3a of the lens 3 becomes 0. In this case, the change Δb is sufficiently small with respect to the thermal expansion rate k2, so that the distance Δc by which the one end face 4a of the optical fiber 4 approaches the focal point 7 depends only on the thermal expansion rate k2 as seen from the equation (6). In the LD module 6A whose the inlet distance a does not depend on the temperature, the optical coupling efficiency is controlled only by the thermal expansion rate k2 or the outlet distance. This LD module 6A can therefore provide the stable optical coupling efficiency.

In the LD module 6A, as mentioned earlier, KOVAR (having a coefficient of linear expansion of $5 \times 10^{-6}$) can be used for the cap 15, SUS 304 of stainless steel (having a coefficient of linear expansion of $16 \times 10^{-6}$) can be used for the lens holder 35, and an iron-based alloy (having a coefficient of linear expansion of $11 \times 10^{-6}$) can be used for the pedestal 12. The change Δb can be minimized by adequately setting the lengths of the pedestal 12, the cap 15 and the area A of the lens holder 35 based on the coefficients of linear expansion of those members in such a way that k1 becomes 0 as mentioned above.

Table 1 shows the focal distance of the sphere lens 3 of the LD module 6A and the materials and coefficients of linear expansion of the members (excluding the end plate 11) that constitute the first link member and the second link member.

TABLE 1

Focal distance f of sphere lens 3: 1.46712 mm (25° C.)

| | | Coefficient of linear expansion (1/° C.) | |
|---|---|---|---|
| Name of member | Material | Upper limit of Standard use (20° C.) | temperature for (85° C.) |
| Pedestal 12 | Iron-based alloy | $11 \times 10^{-6}$ | $11 \times 10^{-6}$ |
| Cap 15 | KOVAR | $5 \times 10^{-6}$ | $5 \times 10^{-6}$ |
| Lens holder 35 | SUS 304 | $16 \times 10^{-6}$ | $16 \times 10^{-6}$ |

Table 2 shows the sizes of the members (excluding the end plate 11) that constitute the first and second link members of the LD module 6A at the standard temperature of 20°

C. and at 85° C. which is the upper limit of temperature for the use of the LD module 6A.

TABLE 2

| Name of member or the like | Length | |
|---|---|---|
| | Standard temperature (20° C.) | Upper limit of temperature for use (85° C.) |
| First link member | | |
| Pedestal 12: L12 | 1.27 mm | 1.270908 mm |
| Cap 15: L15 | 2.3 mm | 2.300748 mm |
| Area A of lens holder 35: L35A | 1.12 mm | 1.121165 mm |
| Second link member | | |
| Area B of lens holder 35: L35B | 5.03 mm | 5.035231 mm |

Table 3 shows the thermal expansion rates k1 and k2 of the first and second link members that are acquired based on the coefficients of linear expansion and the lengths of the members (excluding the end plate 11) constituting the first and second link members, which are given in Tables 1 and 2.

TABLE 3

| Name of member | Thermal expansion rate |
|---|---|
| First link member (Thermal expansion rate k1) | $1.545 \times 10^{-5}$ mm/° C. |
| Second link member (Thermal expansion rate k2) | $8.05 \times 10^{-5}$ mm/° C. |

Table 4 shows the distances a and c, and changes $\Delta a$, $\Delta b$ and $\Delta c$ that are obtained from the equations 3, 4 and 6 based on the distances a and c and the thermal expansion rates k1 and k2 given in Table 3.

TABLE 4

| Distance or change | Length | |
|---|---|---|
| | Standard temperature (20° C.) | Upper limit of temperature for use (85° C.) |
| Distance a | 2.15 mm | 2.151 mm |
| Distance b | 4.62 mm | 4.615 mm |
| Distance c | 0.88 mm | 0.885 mm |
| Change $\Delta a$ | | $1.17 \times 10^{-3}$ mm |
| Change $\Delta b$ | | $5.32 \times 10^{-3}$ mm |
| Change $\Delta c$ | | 0.011 mm |

As apparent from Table 4, the change $\Delta c$ when the environmental temperature changes from 20° C. to 85° C. is smaller than the distance c at 20° C., which satisfies the condition of $\Delta c$ (25° C.–85° C.)$\leq$c (20° C.) given in the equation (7). As apparent from the value of the change $\Delta c$, the one end face 4a of the optical fiber 4 comes closer to the focal point 7 by 0.011 mm at 85° C. compared to at 20° C. That is, the optical coupling efficiency increases in accordance with a temperature rise ($\Delta T=65°$ C. in this case). The increase in optical coupling efficiency compensates for the decline of the output of the LD 1 caused by the temperature rise thereof. This suppresses a change in the optical output from the optical fiber 4 caused by the temperature rise of the LD 1. Specifically, the optical outputs at 85° C. and 20° C. are respectively 0.12 mW and 0.125 mW and the difference in optical output between both temperatures is very small.

Although the LD module 6A has been described as a receptacle module, the invention can be adapted to other LD modules, such as a pig tale module.

Figure 4:
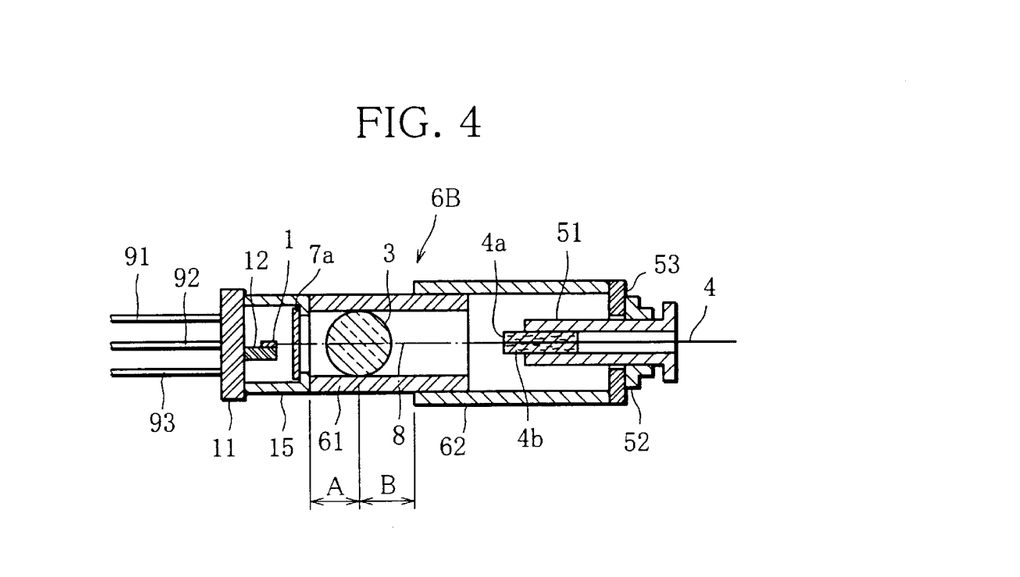
FIG. 4 is a longitudinal cross-sectional view of an LD module 6B according to another embodiment of the invention.

An LD module 6B in FIG. 4 outputs a laser beam from the optical fiber 4. To avoid the redundant description, same symbols are given to those components of the LD module 6B in FIG. 4 which have substantially the same functions and shapes as the those of the corresponding components of the LD module 6A in FIG. 1.

The LD module 6B has a lens holder 61 of, for example, KOVAR, which has a hollow cylindrical shape. The lens holder 61 has one end connected to the cap 15. A hollow cylindrical link member 62 of, for example, KOVAR, is fitted over the other end of the lens holder 61, and a disc-shaped member 53 is secured to the end of the link member 62 which is remote from the holder 61. A ferrule sleeve 52 is supported on the member 53.

Figure 5:
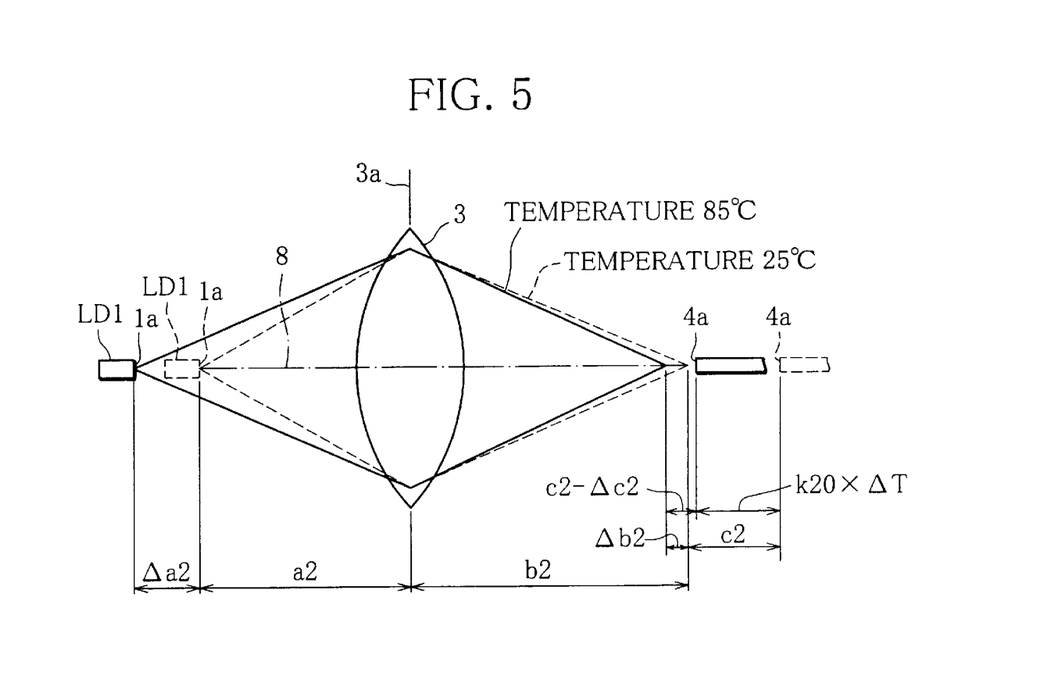
FIG. 5 is a diagram for explaining a change in the focal point of the LD module 6B in FIG. 4, which is caused by a rise in environmental temperature.
Figure 6:
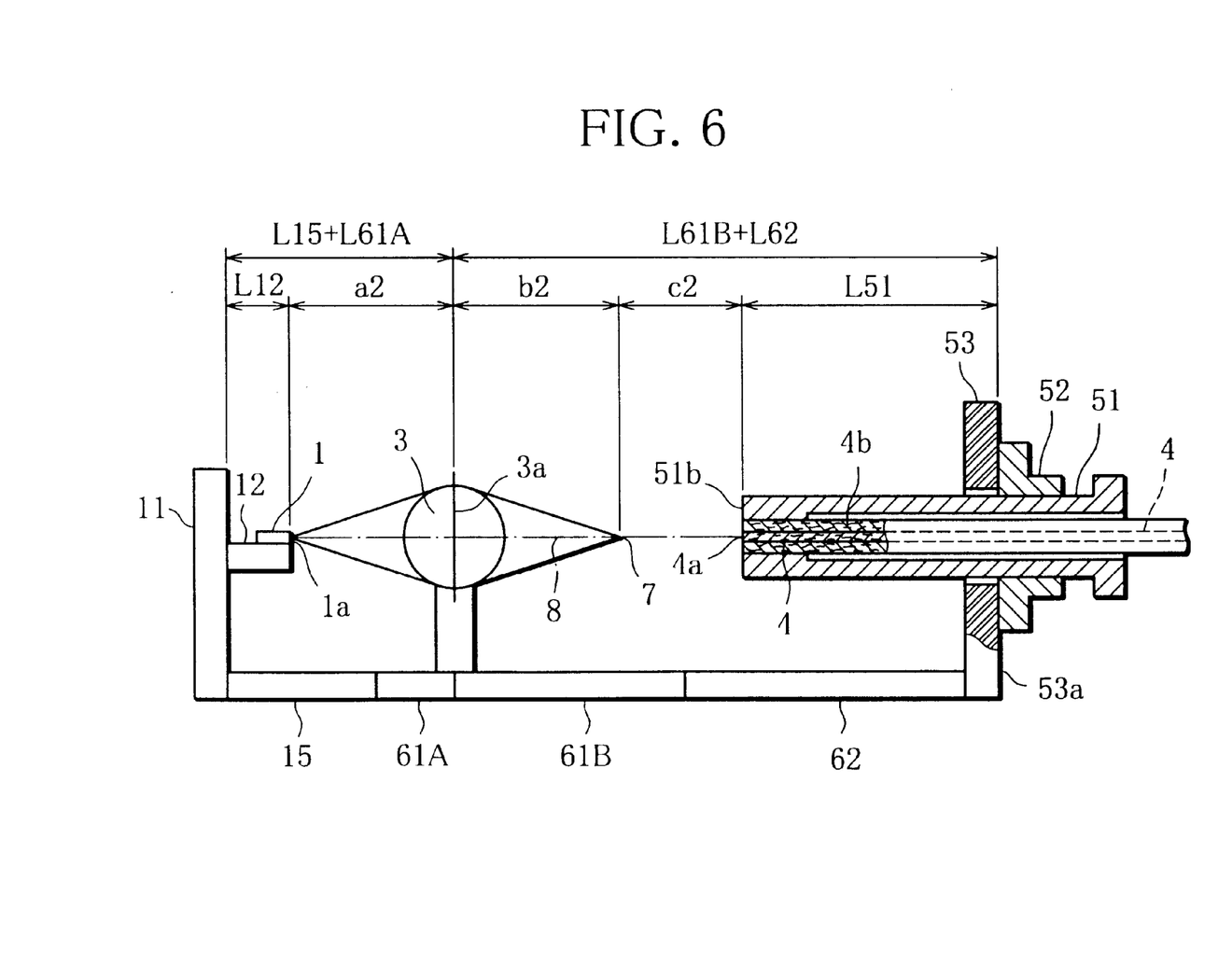
FIG. 6 is a diagram for explaining relative positions of individual members that constitute the LD module 6B in FIG. 4.

In the optical axis alignment of the LD module 6B, the ferrule sleeve 52 is moved in a direction perpendicular to the optical axis 8 with respect to the member 53, so that the relative position between the ferrule sleeve 52 and the member 53 is determined. As a result, the optical fiber 4 is positioned accurately on the optical axis 8. Thereafter, the ferrule sleeve 52 and the member 53 are coupled together. In the focus point adjustment of the LD module 6B, as schematically illustrated in FIGS. 5 and 6, the ferrule sleeve 52 and a ferrule holder 51 are connected together in such a way that one end face 4a of the optical fiber 4 is positioned apart by a predetermined distance c2 along the optical axis from the focal point 7 of the lens 3 to the opposite side of the lens 3 in consideration of the influence of a rise in environmental temperature on the LD module 6B.

The following equations (20), (21) and (22) respectively correspond to the equations (1), (2) and (3) that have been given in the foregoing description of the LD module 6A.

$$\Delta a2 = ((L15 \times \alpha15 + L61A \times \alpha61A) - L12 \times \alpha12) \times \Delta T \quad (20)$$

$$= L10 \times \alpha10 \times \Delta T \quad (21)$$

$$= k10 \times \Delta T \quad (22)$$

In the equation (20), L61A is the length of area A of the lens holder 61 and $\alpha61$ is the coefficient of linear expansion of the lens holder 61. In the equation (21), L10 and $\alpha10$ are respectively an equivalent length and an equivalent coefficient of linear expansion of the pedestal 12, the cap 15 and the area A of the lens holder 61 all considered as a single member. Given that L10×$\alpha$10 is k10, k10 indicates a unit change (mm/° C.) in inlet distance a2 or a thermal expansion rate when the environmental temperature rises by 1° C. Therefore, k10=(L15×$\alpha$15+L35A×$\alpha$35)−L12×$\alpha$12.

In the LD module 6B, the first link member that defines the relative distance between the end face 1a of the LD 1 and the input-side principal plane 3a of the lens 3 comprises the pedestal 12, the cap 15, the area A of the lens holder 61 and the end plate 11 to which the pedestal 12 and the cap 15 are secured. It can be denoted that the length and the coefficient of linear expansion of the first link member are respectively L10 and $\alpha$10.

The following equations (23) and (25) respectively correspond to the equations (5) and (6) that have been given in the foregoing description of the LD module 6A.

$$\Delta c2 = (L51 \times \alpha51 - (L61B \times \alpha61 + L62 \times \alpha62)) \times \Delta T - \Delta b2 \quad (23)$$

$$= L20 \times \alpha20 \times \Delta T - \Delta b2 \quad (24)$$

$$= k20 \times \Delta T + \Delta b2 \quad (25)$$

In the equation (23), the length L61B is the length of area B of the lens holder 61, and the length L61B and the length L62, as schematically shown in FIG. 6, are values measured without duplication over the overlap position where the holder 61 is fitted in the link member 62. In the equation (24), L20 and α20 are respectively an equivalent length and an equivalent coefficient of linear expansion of an assembly of the ferrule holder 51, the area B of the lens holder 61 and the link member 62. Given that L20×α20 being k20, k20 indicates a unit change (mm/° C.) in the relative distance between the one end face 4a of the optical fiber 4 and the output-side principal plane 3a of the lens 3 or a thermal expansion rate with respect to a rise in temperature by 1° C. Therefore, k20=L51×α51−(L61B×α61+L62×α62).

In the LD module 6B, the second link member that defines the relative distance between the one end face 4a of the optical fiber 4 and the output-side principal plane 3a of the lens 3 comprises the ferrule holder 51, the area B of the lens holder 61, the link member 62 and the member 53 to which the ferrule holder 51 and the link member 62 are secured. It can be denoted that L20 and α20 are the length and the coefficient of linear expansion of the second link member, respectively.

Because of the same reason given in the case of the LD module 6A, it is necessary that the distance c2 and the change Δc2 have the relationship that is given by the following equation (26).

$$0 < \Delta c2 \leq c2 \tag{26}$$

That is, the distance c2 and the change Δc2 should meet the following equation (27).

$$0 < \Delta c2 = k20 \times \Delta T - \Delta b2 \leq c2 \tag{27}$$

It is therefore apparent that the lengths and the coefficients of linear expansion of the pedestal 12, the cap 15, the lens holder 61, the link member 62 and the ferrule holder 51 should be so selected as to satisfy the equation (27) in manufacturing the LD module 6B. In the LD module 6B set this way, the distance b2 is shorter than the outlet distance by the distance c2 when the environmental temperature is room temperature. As the environmental temperature rises, the distance b2 becomes shorter by the change Δb2. As the outlet distance becomes shorter by more than the change Δb2, however, the focal point 7 of the lens 3 and the one end face 4a of the optical fiber 4 come closer to each other by the change Δc2.

The value of the change Δc2 is set to increase in accordance with the increase ΔT in environmental temperature by selecting the material for the ferrule holder 51 whose coefficient of linear expansion α51 is sufficiently larger than the coefficients of linear expansion α15, α61 and α62 of the cap 15, the lens holder 61 and the link member 62. In other words, the one end face 4a of the optical fiber 4 can be made closer to the focal point 7 of the lens 3 in accordance with the increased temperature ΔT. When the environmental temperature rises, therefore, the optical coupling efficiency increases so that the decline of the optical output of the LD 1 caused by the temperature rise thereof can be compensated for by the improved optical coupling efficiency. This compensation can suppress the temperature dependency of the optical output from the optical fiber 4 of the LD module 6B.

Because of the same reason given in the case of the LD module 6A, the following equation (28) corresponding to the equation (10) is met when Δb2 is made approximately equal to Δa2 (Δa2≈Δb2) in the LD module 6B.

$$k20 \times \Delta T > k10 \times \Delta T$$

$$k20 > k10 \tag{28}$$

As in the case of the LD module 6A, when Δa2, thus Δb2, is so small as to be negligible with respect to Δc2, the following equation (29) similar to the equation (11) is satisfied.

$$\Delta c2 = k20 \times \Delta T \leq c2 \tag{29}$$

In the LD module 6B, it is possible to use material having a small coefficient of linear expansion, such as KOVAR or Invar, for the cap 15, the lens holder 61 and the link member 62 and to use material having a large coefficient of linear expansion, such as an aluminum alloy, for the ferrule holder 51. Tables 5 to 8, like Tables 1 to 4, show various parameters of the LD module 6B.

As apparent from the positional change Δc2 given in Table 8, the one end face 4a of the optical fiber 4 at 85° C. is closer to the focal point 7 than that at 25° C., thereby improving the optical coupling efficiency of the LD module 6B.

TABLE 5

Focal distance f of sphere lens 3: 1.46712 mm (25° C.)

| | | Coefficient of linear expansion (1/° C.) | |
|---|---|---|---|
| Name of member | Material | Standard temperature (25° C.) | Upper limit of temperature for use (85° C.) |
| Cap 15 | KOVAR | $5 \times 10^{-6}$ | $5 \times 10^{-6}$ |
| Lens holder 61 | KOVAR | $5 \times 10^{-6}$ | $5 \times 10^{-6}$ |
| Link member 62 | KOVAR | $5 \times 10^{-6}$ | $5 \times 10^{-6}$ |
| Ferrule holder 51 | Aluminum alloy | $23 \times 10^{-6}$ | $23 \times 10^{-6}$ |

TABLE 6

| | Length | |
|---|---|---|
| Name of member or the like | Standard temperature (25° C.) | Upper limit of temperature for use (85° C.) |
| First link member | | |
| Equivalent length: L10 | 3.0000 mm | 3.0009 mm |
| Second link member | | |
| (length L61B of area B of lens holder 61) + (length L62 of link member 62) | 9.900 mm | 9.903 mm |
| Ferrule holder 51: L51 | 7.000 mm | 7.010 mm |

TABLE 7

| Name of member | Thermal expansion rate |
|---|---|
| First link member (Thermal expansion rate k10) | $5 \times 10^{-6}$ mm/° C. |
| Second link member (Thermal expansion rate k20) | $1.1 \times 10^{-4}$ mm/° C. |

TABLE 8

| Distance or change | Length | |
|---|---|---|
| | Standard temperature (25° C.) | Upper limit of temperature for use (85° C.) |
| Distance a2 | 3.00 mm | 3.009 mm |
| Distance c2 | 0.03 mm | 0.02 mm |
| Change Δa2 | | $9.0 \times 10^{-4}$ mm |
| Change Δb2 | | $8.2 \times 10^{-4}$ mm |
| Change Δc2 | | 0.01 mm |

Figure 7:
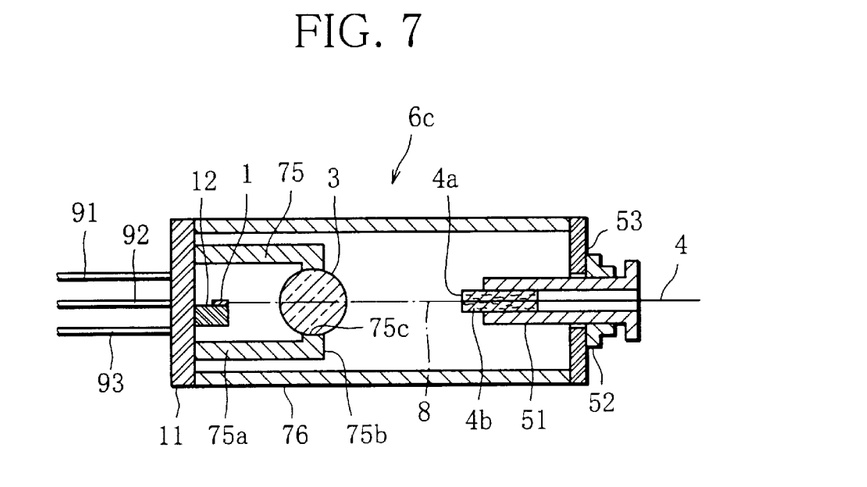
FIG. 7 is a longitudinal cross-sectional view of an LD module 6C according to a further embodiment of the present invention.

An LD module 6C in FIG. 7 outputs a laser beam from the optical fiber 4. To avoid the redundant description, same symbols are given to those components of the LD module 6C which have substantially the same functions and shapes as those of the corresponding components of the LD module 6A in FIG. 1 or the LD module 6B in FIG. 4.

Although the LD modules 6A and 6B have been described with the positions of the principal planes 3a of the lens 3 in the direction of the optical axis taken as reference points, the position of the end face 1a of the LD1 in the direction of the optical axis is taken as a reference point for the sake of convenience.

The LD module 6C has a cap 75 in which a window 75c is formed. The lens 3 is fitted in the window 75c. The lens 3, the end plate 11 and the cap 75 define an airtight chamber which is filled with an inactive gas.

A link member 76 having a hollow cylindrical shape is connected to the end plate 11. The link member 76 is longer than the cap 15 in axial direction and is larger in diameter. The cap 15 is concentrically arranged in the link member 76.

Figure 8:
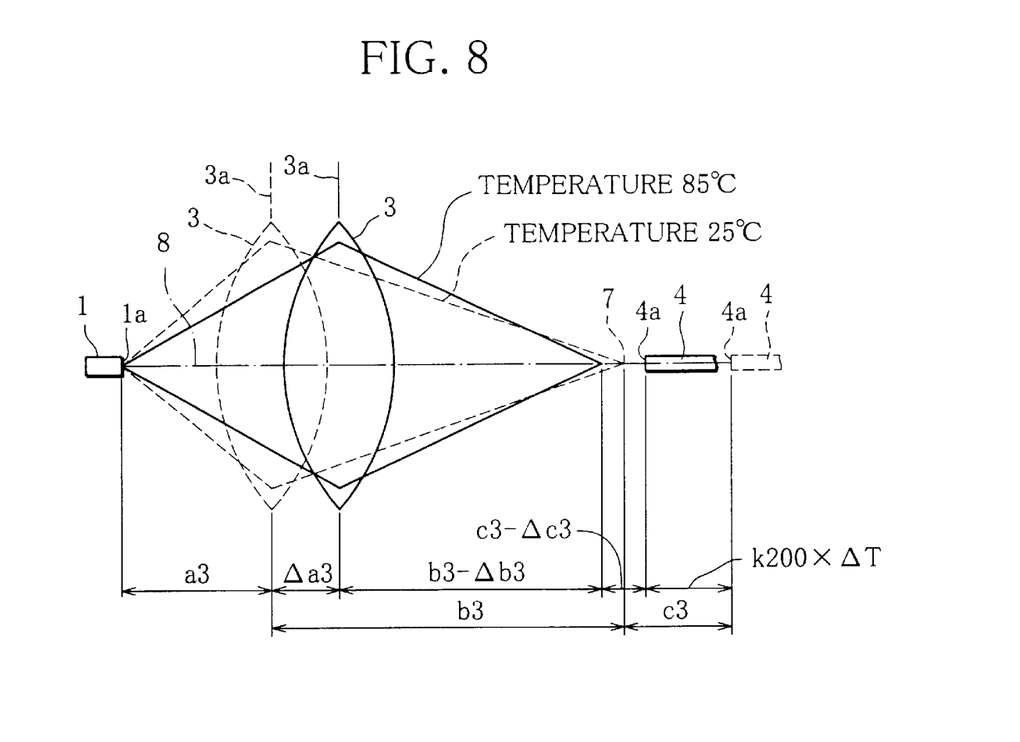
FIG. 8 is a diagram for explaining a change in the focal point of the LD module 6C in FIG. 7, which is caused by a rise in environmental temperature.
Figure 9:
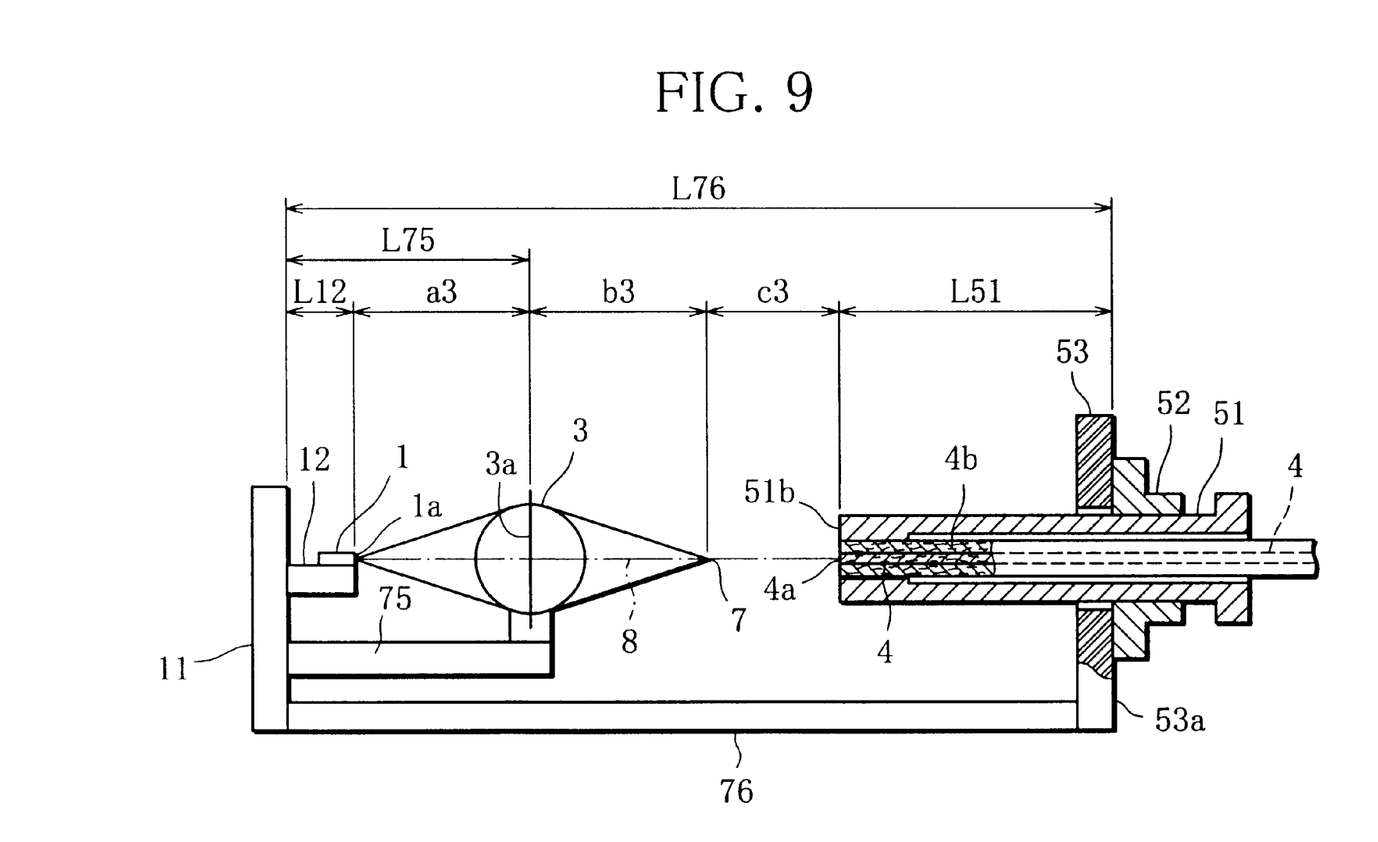
FIG. 9 is a diagram for explaining relative positions of individual members that constitute the LD module 6C in FIG. 7.

In the optical axis alignment of the LD module 6C, as in the case of the LD module 6B, the ferrule sleeve 52 and the member 53 are fixed together. In the focus point adjustment of the LD module 6C, as schematically illustrated in FIGS. 8 and 9, the ferrule sleeve 52 and the ferrule holder 51 are connected together in such a way that the one end face 4a of the optical fiber 4 is positioned apart by a predetermined distance c3 along the optical axis from the focal point 7 to the opposite side of the lens 3.

As easily inferred from the foregoing description of the LD module 6B, one end face 4a of the optical fiber 4 can be made closer to the focal point 7 in accordance with the temperature increase ΔT by setting the coefficient of linear expansion of the ferrule holder 51 sufficiently larger than the coefficient of linear expansion of each of the cap 75 and the link member 76 in the LD module 6C having the above-described structure. Specifically, the link member 76 should be made of, for example, KOVAR having a small coefficient of linear expansion and the ferrule holder 51 should be made of, for example, an aluminum alloy having a large coefficient of linear expansion. Those settings can increase the optical coupling efficiency in accordance with the temperature increase ΔT and the increase in optical coupling efficiency can compensate for the drop of the optical output of the LD1 caused by the temperature rise thereof.

In the LD module 6C, the first link member that defines the relative distance between the end face 1a of the LD1 and the input-side principal plane 3a of the lens 3 comprises the pedestal 12, the cap 75 and the face of the end plate 11 to which the pedestal 12 and the cap 75 are secured.

In the LD module 6C, the second link member that defines the relative position between one end face 4a of the optical fiber 4 and the output-side principal plane 3a of the lens 3 comprises the ferrule holder 51, the link member 76 and the member 53 to which the ferrule holder 51 and the link member 76 are secured.

In the LD module 6C, a change Δa3 of an inlet distance a3 between the output-side end face 1a of the LD1 and the input-side principal plane 3a of the lens 3, which is caused by a temperature rise, can be suppressed to a minute value or substantially 0 by adequately setting the lengths of the pedestal 12 of, for example, an iron-based alloy having a predetermined coefficient of linear expansion and the cap 75 of, for example, KOVAR.

Although the length of the second link member or the outlet distance changes in accordance with a rise in environmental temperature in the LD modules 6A, 6B and 6C, the lengths and the coefficients of linear expansion of the first link member and the second link member may be set in such a way that only the inlet distance depends on the temperature but the outlet distance does not. In case where the outlet distance does not depend on the temperature, the first link member should be set in such a way that the inlet distance makes a predetermined change as the environmental temperature rises. That is, as the inlet distance changes, the spatial distance between the output-side principal plane of the lens and the focal point of the lens changes in accordance with the formula of the lens given in the equation (4). The use of a change in this distance can move the focal point closer to the position of the end face of the optical fiber relatively, thereby improving the optical coupling efficiency. This results in compensation for the temperature dependency of the optical output of the LD.

With regard to an LD module whose outlet distance does not depend on the temperature, the optical coupling efficiency depends only on the inlet distance, so that the LD module can achieve a stable optical coupling efficiency.

What is claimed is:

1. A laser diode module comprising:
    a laser diode having an end face from which a laser beam is emitted;
    a lens for condensing the laser beam from said laser diode at a focal point thereof, said lens having an input-side principal plane and an output-side principal plane;
    an optical fiber having an end face for receiving the laser beam condensed by said lens and delivering the received laser beam as an output of said module; and
    support means for supporting said laser diode, said lens and said optical fiber and securing an inlet distance between the end face of said laser diode and the input-side principal plane of said lens and an outlet distance between the output-side principal plane of said lens and the end face of said optical fiber,
    wherein said support means positions the end face of said optical fiber at a deviation position apart from the focal point of said lens by an allowable distance with respect to the output of said module when a temperature of said laser diode module is room temperature and moves the end face of said optical fiber at a close position relatively closer to the focal point than the deviation position when said temperature of said laser diode module rises from the room temperature.

2. The laser diode module according to claim 1, wherein said support means includes:
    a first link member for linking said laser diode to said lens with the end face of said laser diode and the input-side principal plane of said lens being set apart by the inlet distance; and
    a second link member for linking said lens to said optical fiber with the output-side principal plane of said lens and the end face of said optical fiber being set apart by the outlet distance.

3. The laser diode module according to claim 2, wherein a length and a coefficient of linear expansion of said second link member are so set as to make the outlet distance decrease when said temperature of said laser diode module rises from the room temperature.

4. The laser diode module according to claim 2, wherein a length and a coefficient of linear expansion of said second link member are so set as to make the outlet distance increase when said temperature of said laser diode module rises from the room temperature.

5. The laser diode module according to claim 3, wherein said first link member includes:
 a base plate;
 a pedestal extending from said base plate toward said lens and having a distal end to which said laser diode is mounted;
 a relay member extending from said base plate toward said lens and having a coefficient of linear expansion different from that of said pedestal; and
 a lens holder for coupling said relay member and said lens, said lens holder having a coefficient of linear expansion different from those of said pedestal and said relay member.

6. The laser diode module according to claim 5, wherein said support means allows the end face of said optical fiber to coincide with the focal point of said lens when the temperature of said laser module reaches to a temperature within a range of 60° C. to 90° C.

7. The laser diode module according to claim 5, wherein a length and a coefficient of linear expansion of said first link member and a length and a coefficient of linear expansion of said second link member are set in such a way that when said temperature of said laser diode module rises from the room temperature, one of the inlet distance and outlet distance changes but the other of the inlet distance and outlet distance does not change.

8. The laser diode module according to claim 7, wherein said first link member does not change the inlet distance and said second link member changes the outlet distance.

9. The laser diode module according to claim 8, wherein the inlet distance is approximately twice a focal distance of said lens and a distance between the output-side principal plane of said lens and the focal point of said lens does not change when said temperature of said laser diode module rises from the room temperature.

* * * * *